(12) United States Patent
Du et al.

(10) Patent No.: US 8,023,597 B2
(45) Date of Patent: Sep. 20, 2011

(54) METHODS FOR SELECTING A COARSE FREQUENCY OFFSET ESTIMATION FOR AN ORTHOGONAL FREQUENCY DIVISION MULTIPLEXING MODULATED SIGNAL

(75) Inventors: Jianxuan Du, San Jose, CA (US); Yue Chen, Fremont, CA (US); Baoguo Yang, San Jose, CA (US)

(73) Assignee: Augusta Technology, Inc., Santa Clara, CA (US)

( * ) Notice: Subject to any disclaimer, the term of this patent is extended or adjusted under 35 U.S.C. 154(b) by 729 days.

(21) Appl. No.: 12/103,698

(22) Filed: Apr. 15, 2008

(65) Prior Publication Data
US 2008/0260056 A1 Oct. 23, 2008

Related U.S. Application Data

(60) Provisional application No. 60/912,416, filed on Apr. 17, 2007.

(51) Int. Cl.
*H04L 27/06* (2006.01)

(52) U.S. Cl. .................. 375/344; 375/354; 455/182.2; 455/192.2

(58) Field of Classification Search .............. 375/344, 375/354, 359, 362, 371, 145, 149; 370/503, 370/516; 455/182.1, 182.2, 192.1, 192.2
See application file for complete search history.

(56) References Cited

U.S. PATENT DOCUMENTS

| | | | |
|---|---|---|---|
| 7,308,063 B2 * | 12/2007 | Priotti | 375/362 |
| 7,782,985 B2 * | 8/2010 | Wang | 375/344 |

* cited by examiner

*Primary Examiner* — Dac Ha
(74) *Attorney, Agent, or Firm* — Venture Pacific Law, PC

(57) ABSTRACT

The present invention provides methods for selecting the coarse frequency offset estimation in an orthogonal frequency division multiplexing system that may include: searching within a predefined subset for a set of frequency offset candidates; selectively searching outside the predefined subset for additional frequency offset candidates; and combining one or more ICDC method and CIR based method to select the coarse frequency offset.

18 Claims, 4 Drawing Sheets

US 8,023,597 B2

METHODS FOR SELECTING A COARSE FREQUENCY OFFSET ESTIMATION FOR AN ORTHOGONAL FREQUENCY DIVISION MULTIPLEXING MODULATED SIGNAL

CROSS REFERENCE

This application claims priority from a provisional patent application entitled "Methods for Extended Coarse Frequency Offset Estimation and PRS-Verification" filed on Apr. 17, 2007 and having an Application No. 60/912,416. Said application is incorporated herein by reference.

FIELD OF THE INVENTION

This invention relates to methods for selecting a coarse frequency offset estimation for an orthogonal frequency division multiplexing ("OFDM") modulated signal, and, in particular to, methods for searching within a selected range of frequency offsets to find a coarse frequency offset estimation for an OFDM modulated signal.

BACKGROUND OF THE INVENTION

Orthogonal frequency division multiplexing is a multi-carrier transmission technique that uses orthogonal subcarriers to transmit information within an available spectrum. Since the subcarriers may be orthogonal to one another, they may be spaced much more closely together within the available spectrum than, for example, the individual channels in a conventional frequency division multiplexing ("FDM") system.

In an OFDM system, the subcarriers may be modulated with a low-rate data stream before transmission. It is advantageous to transmit a number of low-rate data streams in parallel instead of a single high-rate stream since low symbol rate schemes suffer less from intersymbol interference ("ISI") caused by the multipath. For this reason, many modern digital communications systems are turning to the OFDM system as a modulation scheme for signals that need to survive in environments having multipath or strong interference. Many transmission standards have already adopted the OFDM system, including the IEEE 802.11a standard, the Digital Video Broadcasting Terrestrial ("DVB-T"), the Digital Audio Broadcast ("DAB"), and the Digital Television Broadcast ("T-DMB").

Although the OFDM system is advantageous in combating intersymbol interference, it is quite sensitive to frequency deviations. The frequency deviations may be caused by the difference in the oscillator frequency of the receiver and the transmitter, or by the Doppler shift of the signal due to movement of either the receiver or the transmitter. Large frequency deviations cause significant interference between signals at different subcarriers, hence result in dramatic performance degradation. Therefore, frequency offset estimation to correct the frequency deviations is critical for delivering good transmission quality.

The existent frequency offset estimation methods include the intercarrier differential correlation ("ICDC") method and the channel impulse response ("CIR") based method. The ICDC method becomes cumbersome when there are many possible frequency shifts to search from since the ICDC must be computed for each frequency shift. For example, in the DAB and T-DMB standards, the number of frequency shifts is 401 in Mode I to support the maximum frequency offset of 200 kHz. The ICDC method may also return false results, due to the periodicity in the phase reference symbol, when used alone to calculate frequency offsets. The CIR based method has better performance at the cost of even greater complexity since one inverse fast Fourier transform ("IFFT") must be performed for each frequency shift. Therefore, direct application of the existent methods to support large frequency offsets is problematic. It is therefore desirable to have novel methods for the estimation of coarse frequency offset for the demodulation of a received OFDM signal.

SUMMARY OF THE INVENTION

An object of this invention is to extend the detection range for selecting a frequency offset estimation of an OFDM modulated signal without a significant increase in complexity.

According to the present invention, methods for selecting the coarse frequency offset estimation in an orthogonal frequency division multiplexing system are disclosed. These methods for selecting the coarse frequency offset estimation may include: searching within a predefined subset for a set of frequency offset candidates; selectively searching outside the predefined subset for additional frequency offset candidates; and combining the ICDC method and the CIR based method to select a coarse frequency offset.

An advantage of this invention is to extend the detection range for selecting the coarse frequency offset estimation of an OFDM modulated signal without a significant increase in complexity.

DETAILED DESCRIPTION OF THE PREFERRED EMBODIMENTS

In order to aid in the understanding of the preferred embodiment of this invention, a brief description of an OFDM modulated signal will be presented first, followed by the detailed description of the preferred embodiments.

Figure 1:
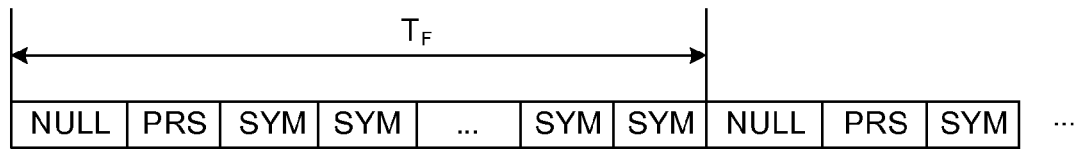
FIG. 1 illustrates the transmission frame structure of an OFDM system.

In an OFDM modulated signal, the transmitted signal is modulated at each subcarrier in the frequency domain. The transmission frame is formed when a fixed number of OFDM symbols are grouped. The frame structure is shown in FIG. 1. No signal is sent during the NULL symbol period of duration $T_{NULL}$. The transmission frame duration is represented by $T_F$.

The complex baseband representation of the OFDM signal is expressed by Equation (1):

$$s(t) = \sum_{m=-\infty}^{\infty} \sum_{l=0}^{L} \sum_{k=-K/2}^{K/2} z_{m,l,k} g(t - mT_F - T_{NULL} - (l-1)T_s) \quad (1)$$

where $g_{k,l}(t)$ is expressed by Equation (2):

$$g_{k,l}(t) = \begin{cases} 0 & \text{for } l = 0 \\ e^{2j\pi k(t-\Delta)/T_U} Rect(t/T_s) & \text{for } l = 1,2,\ldots,L \end{cases} \quad (2)$$

The variables of Equation (1) and Equation (2) may be defined as the following: L is the number of OFDM symbols in each transmission frame; K is the number of transmitted subcarriers; $\Delta$ is the guard interval, also known as the cyclic prefix ("CP"), for combating ISI; $T_U$ is the inverse of the subcarrier spacing; and $T_s = T_U + \Delta$ is the OFDM symbol duration, excluding the NULL symbol. The subcarrier spacing is further defined as the signal bandwidth divided by the fast Fourier transform ("FFT") size. The differential quadrature phase shift keying ("DQPSK") modulated symbol at subcarrier k of OFDM symbol l in transmission frame m is represented by $z_{m,l,k}$.

The OFDM symbol is demodulated to reproduce the DQPSK modulated symbol, $z_{m,l,k}$, by CP removal and the FFT of the rest of the received OFDM symbol. The channel estimation is not needed due to DQPSK modulation. A phase reference symbol with known DQPSK modulated symbol is transmitted at the beginning of the transmission frame for determining the DQPSK demodulation reference and the DQPSK demodulation synchronization. The coarse frequency offset causes a cyclic shift of the FFT output. The objective of coarse frequency offset estimation is to estimate and correct the cyclic shift.

Figure 2A:
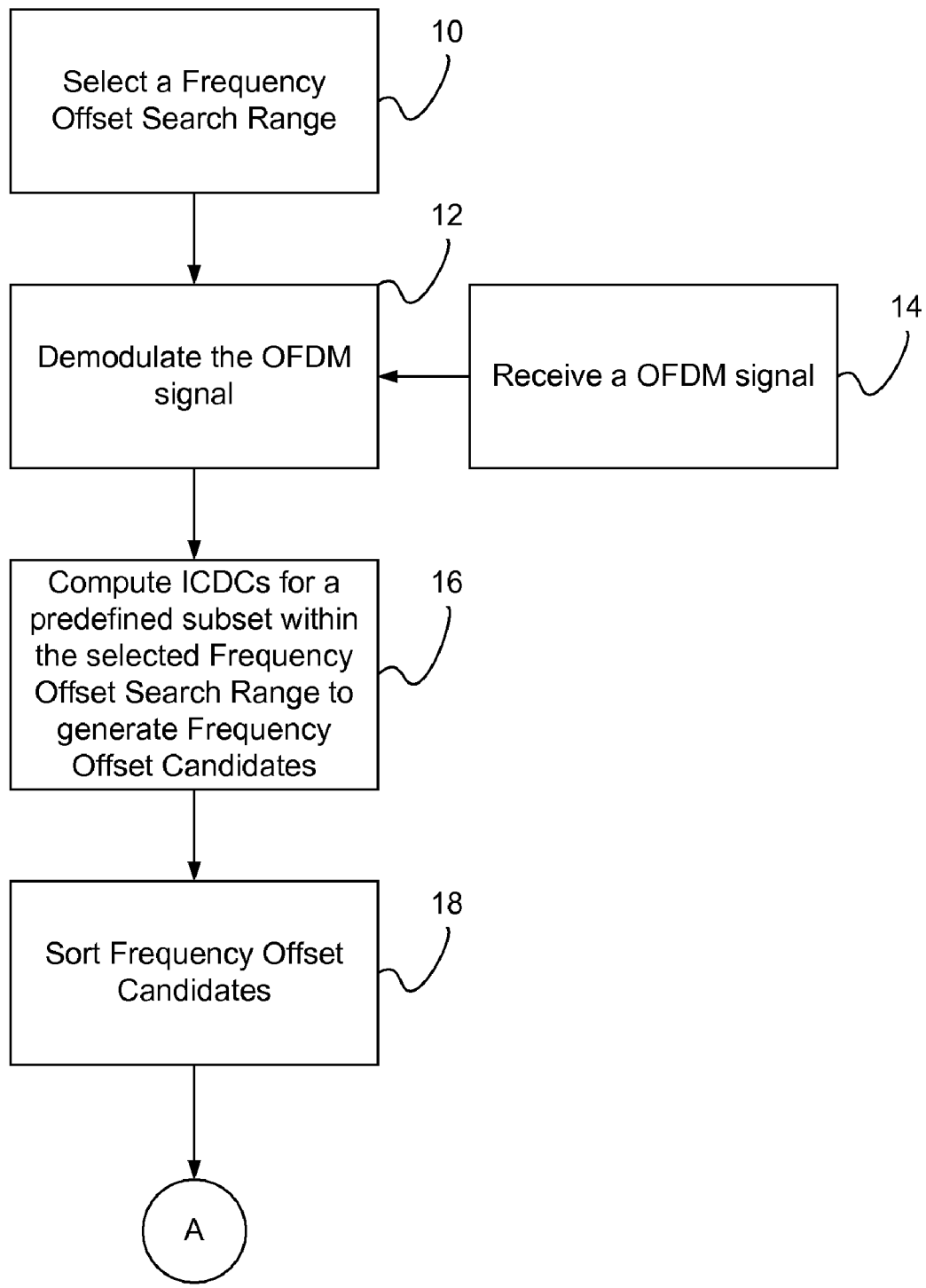
FIGS. 2a-2c illustrate the process flow of the preferred embodiment of this invention.
Figure 2B:
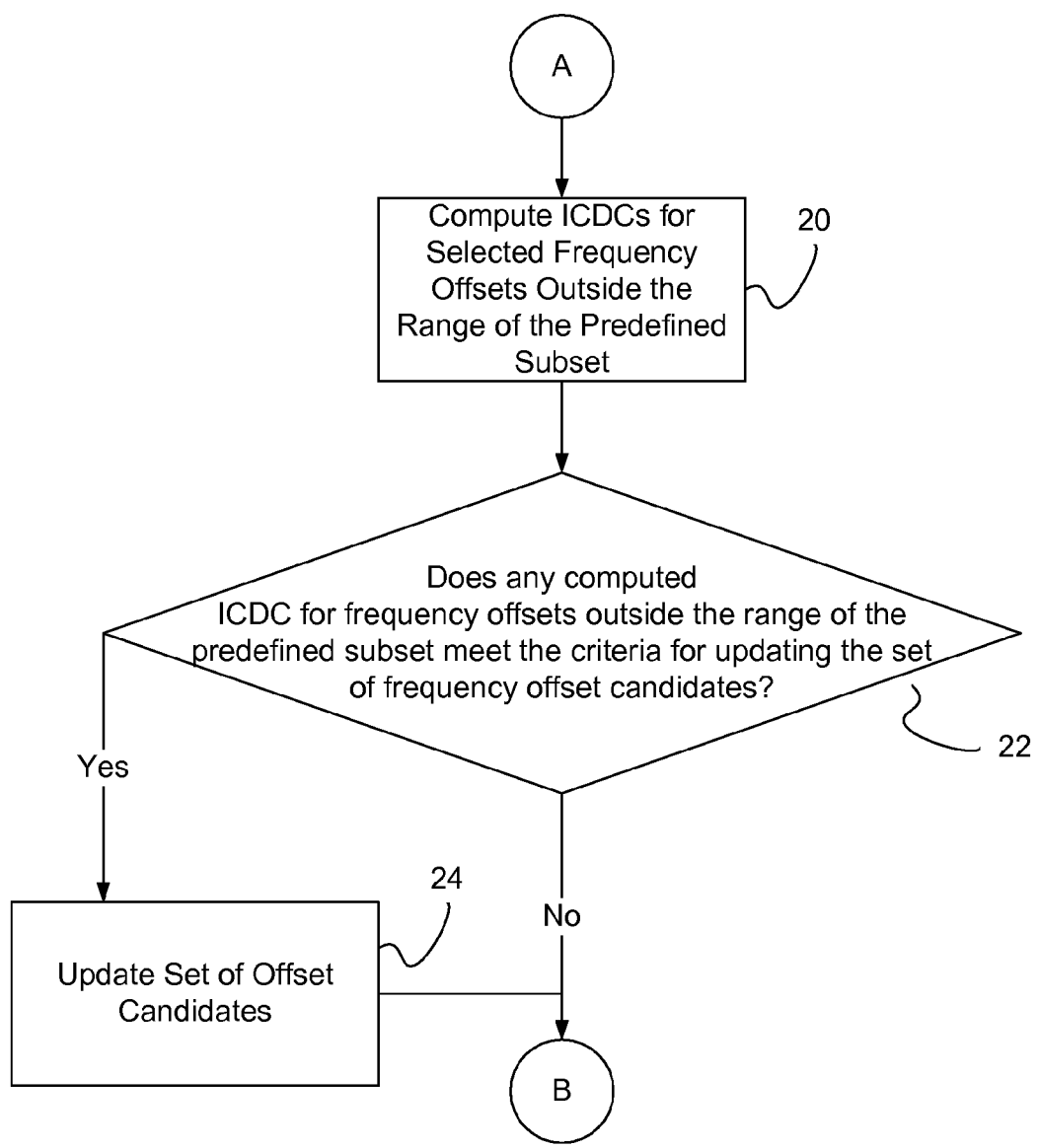
Figure 2C:
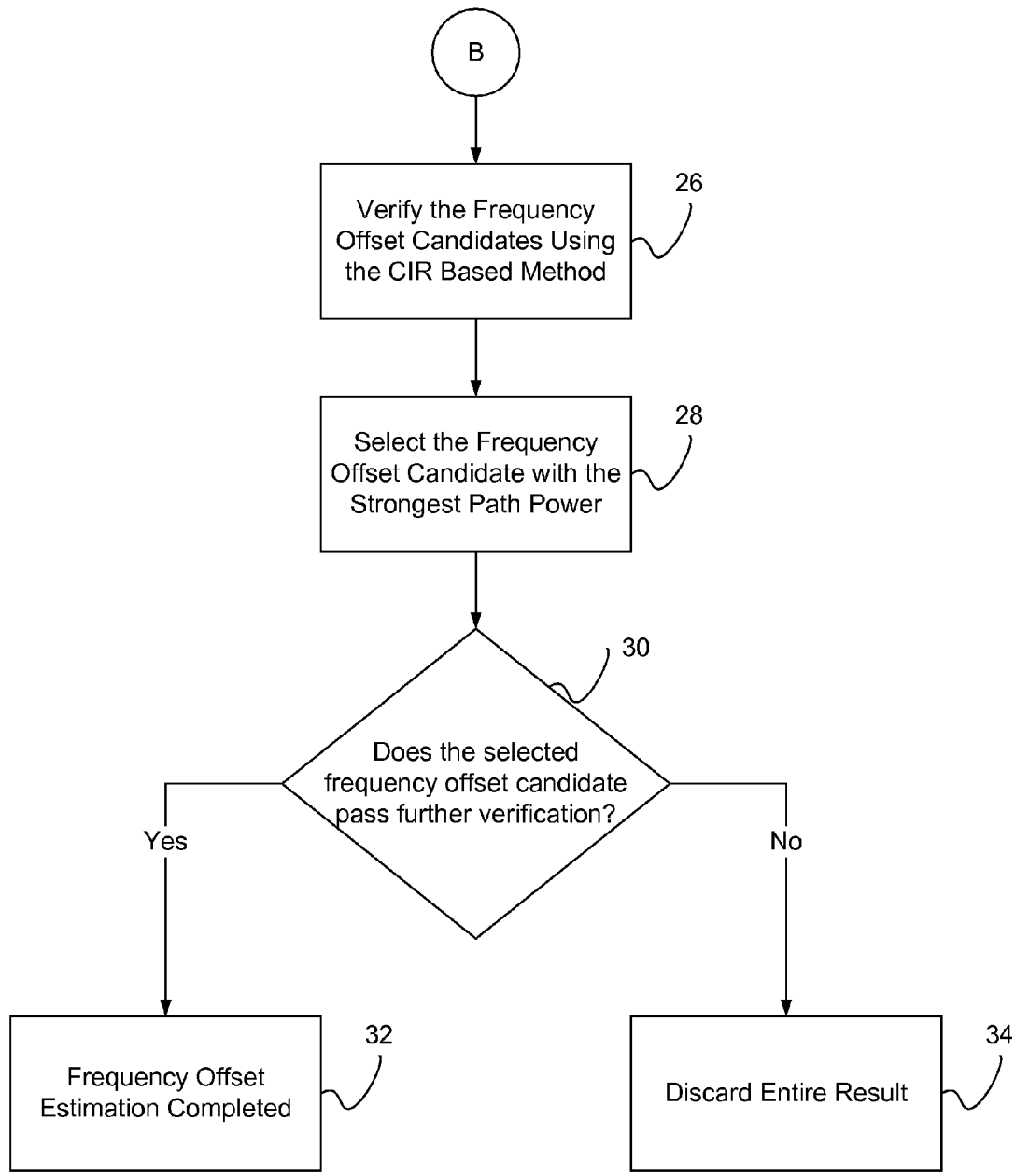

The preferred embodiments will now be described with references to FIGS. 2a-2c in order to aid in the understanding of the preferred embodiments.

First, a frequency offset search range is selected 10. The selected frequency offset search range is selected to inclusively span $-j_{max}$ to $j_{max}$, where $j_{max}$ depends on the subcarrier spacing and the maximum frequency offset supported.

Next, the OFDM modulated signal is received and demodulated 12. The fine-frequency corrected phase reference symbol signal is set to be $\hat{x}[n]$. The OFDM symbol is demodulated by CP removal and FFT, returning the received signal at subcarrier k:

$$\hat{x}[n] \xrightarrow{FFT} z_k \quad (3)$$

After the signal has been demodulated, the phase reference sequence ("PRS") may be tentatively removed from the received signal such that only the channel frequency response remains. Letting the PRS in the frequency domain be $\bar{z}_k$, the channel frequency response can be found by multiplying the received signal at subcarrier k, $z_k$, with the conjugate $\bar{z}_k$ shifted by j, for each integer frequency offset, j. The channel frequency response is expressed in Equation (4).

$$H_k^{(j)} = z_k(\bar{z}_{k+j})^*, \text{ for } k_{lower} \leq k \leq k_{upper}, \quad (4)$$

where $k_{lower}$ is expressed by Equation (5):

$$k_{lower} = \max(-j, 0) - K/2, \, k_{upper} = k_{lower} + L - 1 \quad (5)$$

Next, the ICDC, $C_j$, is continuously computed for each frequency offset, j, of a predefined subset of the selected search range of the frequency offsets 16. Here, "continuously" is understood that every frequency offset, j, in the predefined subset is processed, whether sequentially or not. The ICDC computation is expressed in Equation (6). For the presently preferred embodiment, the predefined subset of the selected search range of frequency offsets, j, is set to span inclusively from −31 to 32.

$$C_j = \sum_{k=k_{lower}+1}^{K_{upper}} H_k^{(j)} \left(H_{k-1}^{(j)}\right)^*, \quad (6)$$

Next, the four largest ICDC amplitudes, $|C_j|$'s are found. The four frequency offsets corresponding to the four largest ICDC amplitudes, $|C_j|$'s are defined as j*[0~3].

For the right frequency offset, the PRS can be removed such that only the channel frequency response remains and the channel frequency response is the same or similar in the adjacent subcarriers. Therefore, the ICDC has maximum ICDC amplitude at the actual frequency shift. However, since there may be false ICDC amplitudes within an interval, the four largest ICDC amplitudes are kept for further examination.

The four frequency offsets corresponding to the four largest ICDC amplitudes, herein referred to as the frequency offset candidates, are sorted in accordance with the given criteria into a list, herein referred to as the set of frequency offset candidates. The sorting process is represented by step 18. First, the frequency offset candidates with absolute ICDC phases less than a predefined threshold are placed into one group, herein referred to as the first group. Then, the rest of the frequency offset candidates with absolute ICDC phases greater than or equal to the predefined threshold are placed into a second group, herein referred to as the second group. Within each group, the frequency offset candidates are sorted in decreasing order of ICDC amplitude. Next, the first group is placed at the beginning of the set of frequency offset candidates followed by the second group. The predefined threshold of the preferred embodiment of this invention is defined to be $0.6\pi$. Equation (7) expresses the absolute ICDC phase requirement of the first group of the preferred embodiment. Equation (8) expresses the absolute ICDC phase requirement of the second group of the preferred embodiment.

$$|\arg(C_j)| < 0.6\pi \quad (7)$$

$$|\arg(C_j)| \geq 0.6\pi \quad (8)$$

After the set of frequency offset candidates has been sorted, a selective search outside the predefined subset of the frequency offset search range may be conducted to find additional frequency offset candidates. This selective search may not exceed the selected frequency offset search range, where the selected frequency offset search range has been defined in step 10. This selective search may be further limited to frequency offsets that are integer multiples of a given value away from the frequency offset candidates. For the preferred embodiments of this invention, the given value is 64. The frequency offsets to be searched in the selective search are expressed in Equation (9).

$$j = j^*[m] + 64i, \text{ where i is an integer and } -j_{max} \leq j \leq j_{max} \quad (9)$$

For each frequency offset of the selective search range, the ICDC is calculated by applying Equation (6) 20. The ICDCs of the frequency offsets within the selective search range is defined to be $C_j$. The ICDC of the frequency offset candidates is defined as $C^*_{j'}$. Each calculated ICDC of the selective search range, $C_j$, is compared with the set of frequency offset candidates, $C^*_{j'}$. The set of frequency offset candidates with the calculated $C_j$ is updated if the following two criteria are met: first, the absolute ICDC phase of $C_j$ must be less than the predefined threshold of $0.6\pi$, as expressed in Equation (10); and second, either the ICDC amplitude of $C_j$ is greater than the ICDC amplitude of $C^*_{j'}$, as expressed in Equation (11), or the absolute ICDC phase of $C^*_{j'}$, is greater than or equal to the predefined threshold of $0.6\pi$, as expressed in Equation (12). Note, the presently preferred embodiment has defined the predefined threshold to be $0.6\pi$ as stated above. The absolute ICDC phase constraint is due to the fact the ICDC with the right integer frequency offset should have an absolute ICDC phase close to zero.

$$|\arg(C_j)| < 0.6\pi \quad (10)$$

$$|C_j| > |C^*_{j'}| \quad (11)$$

$$|\arg(C^*_{j'})| \geq 0.6\pi \quad (12)$$

For each frequency offset of the set of frequency offset candidates, j*[m], the CIR-based method is performed 26, and the frequency offset that produces the strongest path power in the corresponding channel impulse response is selected 28. As an optional verification step, if the strongest path power is greater than a threshold that is dynamically determined by the signal to noise ratio ("SNR"), where SNR is computed by the power difference between the current NULL symbol and the PRS symbol, then PRS verification is successful. In order to eliminate false verification, the CIR based method for j[m]-M and j[m]+M, where M is dependent on the OFDM system is also performed.

If successful PRS verification is reported, but the resultant coarse frequency offset using the CIR based method is not the maximum ICDC amplitude, the two largest path powers corresponding to two most likely frequency offsets determined by the CIR based method are compared 30. If there is no significant difference, PRS verification failure is reported 34.

If PRS verification is successful 32, coarse frequency offset estimation is completed and the estimated coarse frequency offset is $$\Delta f_{int} = \frac{j^*}{2\pi \cdot FFTSize \cdot T_U} \quad (13)$$

While the present invention has been described with reference to certain preferred embodiments, it is to be understood that the present invention is not limited to such specific embodiments. Rather, it is the contention of the inventor that the invention be understood and construed in its broadest meaning as reflected by the following claims. Thus, these claims are to be understood as incorporating not only the preferred embodiments described herein but all those other and further alterations and modifications as would be apparent to those of ordinary skilled in the art.

We claim:

1. A method for selecting a coarse frequency offset in the demodulation of a received orthogonal frequency division multiplexing modulated signal, comprising:
    selecting a frequency offset search range;
    searching within a predefined subset of said frequency offset search range to generate a set of frequency offset candidates having one or more frequency offset candidates, the frequency offset candidates having maximum intercarrier differential correlation ("ICDC");
    searching outside of the predefined subset for additional frequency offset candidates having maximum ICDC and updating the set of frequency offset candidates with these additional frequency offset candidates; and
    choosing a frequency offset from the set of frequency offset candidates, as the coarse frequency offset for demodulation of the received signal.

2. The method of claim 1, wherein in the first searching step, searching continuously within the predefined subset for frequency offset candidates having maximum ICDC.

3. The method of claim 1, wherein in the first searching step, searching within the predefined subset for frequency offset candidates having maximum ICDC as a function of their amplitude and phase.

4. The method of claim 1 wherein the frequency offset candidates are sorted with respect to amplitude and phase.

5. The method of claim 1, wherein in the second searching step, searching selectively outside of the predefined subset for frequency offset candidates having maximum ICDC.

6. The method of claim 1, wherein in the second searching step, searching outside of the predefined subset for frequency offset candidates having maximum ICDC as a function of their amplitude and phase.

7. The method of claim 1, wherein in the second searching step, only frequency offsets that are integer multiples of a given value are searched.

8. The method of claim 1, wherein the chosen frequency offset provides the strongest path power in a corresponding channel impulse response.

9. The method of claim 1, wherein the chosen offset is verified using channel impulse response based phase reference sequence verification procedures.

10. The method of claim 9, wherein, after the choosing step, verifying the chosen offset as a function of signal to noise ratio.

11. The method of claim 1 wherein, verifying the chosen offset as a function of ICDC and channel impulse response based procedures.

12. The method of claim 1 wherein, if the chosen offset is not one of the frequency offset candidates from the first searching step, verifying the chosen frequency offset as a function of the path powers of the frequency offset candidates.

13. A method for selecting a coarse frequency offset in the demodulation of a received orthogonal frequency division multiplexing modulated signal, comprising:
    selecting a frequency offset search range;
    searching continuously within a predefined subset of said frequency offset search range to generate a set of frequency offset candidates having one or more frequency offset candidates, the frequency offset candidates having maximum intercarrier differential correlation ("ICDC");
    searching selectively outside of the predefined subset for additional frequency offset candidates having maximum ICDC and updating the set of frequency offset candidates with these additional frequency offset candidates; and
    choosing a frequency offset from the set of frequency offset candidates, as the coarse frequency offset for demodulation of the received signal, wherein the chosen frequency offset provides the strongest path power in the corresponding channel impulse response and as a function of signal to noise ratio.

14. The method of claim 13, wherein in the searching steps, the searched frequency offset candidates have maximum ICDC as a function of their amplitude and phase.

15. The method of claim 13 wherein the frequency offset candidates are sorted with respect to amplitude and phase.

16. The method of claim 13, wherein in the second searching step, only frequency offsets that are integer multiples of a given value are searched.

17. The method of claim 13 wherein, if the chosen offset is not one of the frequency offset candidates from the first searching step, verifying the chosen frequency offset as a function of the path powers of the frequency offset candidates.

18. A method for selecting a coarse frequency offset in the demodulation of a received orthogonal frequency division multiplexing modulated signal, comprising:
    selecting a frequency offset search range;
    searching continuously within a predefined subset of said frequency offset search range to generate a set of frequency offset candidates having one or more frequency offset candidates, the frequency offset candidates having maximum intercarrier differential correlation ("ICDC") as a function of their amplitude and phase;
    searching selectively outside of the predefined subset for additional frequency offset candidates having maximum ICDC as a function of their amplitude and phase, and updating the set of frequency offset candidates with these additional frequency offset candidates, wherein only frequency offsets that are integer multiples of a given value are searched; and choosing a frequency offset from the set of frequency offset candidates, as the coarse frequency offset for demodulation of the received signal, wherein the chosen frequency offset provides the strongest path power in a corresponding channel impulse response, and wherein the chosen frequency offset is verified using channel impulse response based phase reference sequence verification procedures and as a function of signal to noise ratio.

* * * * *